Figure 1:
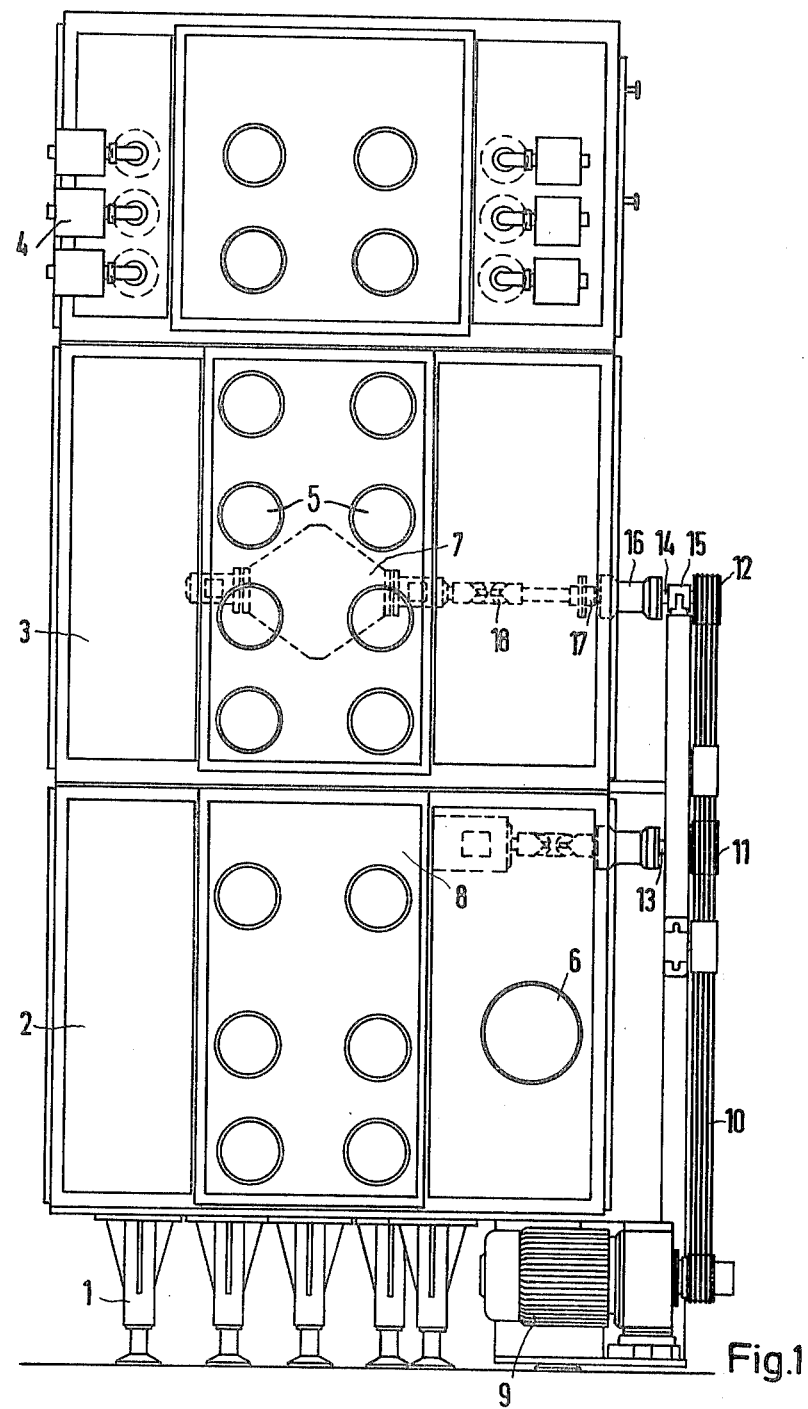

United States Patent [19]

Grün

[11] 4,186,974
[45] Feb. 5, 1980

[54] DEVICE FOR INTRODUCING A FORCE-TRANSMITTING MACHINE ELEMENT INTO A VESSEL

[75] Inventor: Helmut Grün, Hanau, Fed. Rep. of Germany

[73] Assignee: Alkem GmbH, Hanau, Fed. Rep. of Germany

[21] Appl. No.: 794,568

[22] Filed: May 6, 1977

[30] Foreign Application Priority Data

May 10, 1976 [DE] Fed. Rep. of Germany ....... 2620636

[51] Int. Cl.$^2$ ............................................. F16C 13/00
[52] U.S. Cl. ................................. 308/15; 308/187.1; 308/36.3; 74/17.8
[58] Field of Search ........................ 74/18; 214/1 CM; 277/135, 9, 9.5; 141/392; 308/36.3, 187, 15, 187.1, 17.8; 138/97; 137/15; 285/15; 29/401 R, 401 F

[56] References Cited

U.S. PATENT DOCUMENTS

| 3,208,289 | 9/1965 | Hutter et al. ............................ 74/18 |
| 4,000,930 | 1/1977 | Poncet et al. ......................... 277/135 |

Primary Examiner—Houston S. Bell, Jr.
Attorney, Agent, or Firm—Herbert L. Lerner

[57] ABSTRACT

Device for introducing a power-transmitting machine element into a vessel containing an agressive atmosphere and having a wall formed with openings, to the defining margin of which gloves are, respectively, secured, includes: a flange set into the wall, a sealing bearing for a force-transmitting machine element mounted on the flange at the outside of the vessel, and threaded fastening means accessible from the interior of the vessel for threadedly fastening the machine element to the flange, the flange having an outer peripheral surface formed with a bead-like projection at the outside of the vessel to which a covering is securable.

2 Claims, 2 Drawing Figures

DEVICE FOR INTRODUCING A FORCE-TRANSMITTING MACHINE ELEMENT INTO A VESSEL

The invention relates to a device for introducing a power-transmitting machine element into a vessel.

So-called glove boxes are used in many cases for handling radiating or poisonous substances in aggressive atmospheres. Such glove boxes are closed vessels, the atmosphere of which is maintained at negative pressure. In order to be able to deal with devices within the glove box, the latter is formed with openings which are closed off by rubber gloves.

The negative pressure or underpressure within the glove box prevents the atmosphere inside the glove box from coming into contact with the air space outside.

Especially when radiating substances are treated or processed in such a glove box, an effort is made to place, in the interior of the glove box, at most only devices and parts of devices which must, in any event, come into contact with the substance to be treated. Drive units such as motors and transmissions or gear boxes are therefore advantageously disposed outside the glove box.

It is an object of the invention of the instant application to provide a device for introducing power-transmitting machine elements into a vessel, such as a glove box, in such a manner that in case of a defect in the sealing feedthrough, it can be replaced without having any fear of contamination of machine parts disposed outside the vessel.

With the foregoing and other objects in view, there is provided, in accordance with the invention, a device for introducing a power-transmitting machine element into a vessel containing an aggressive (poisonous, radiating, dust-laden or the like) atmosphere and having a wall formed with openings, to the defining margin of which gloves are, respectively, secured, comprising a flange set into the wall, a sealing bearing for a force-transmitting machine element, such as a shaft, mounted on the flange at the outside of the vessel, and threaded fastening means accessible from the interior of the vessel for threadedly fastening the machine element to the flange, the flange having an outer peripheral surface formed with a beadlike projection at the outside of the vessel to which a covering is securable.

In accordance with another feature of the invention, the device includes means for releasably connecting a drive mechanism for the machine element to the sealing bearing and the machine element, at the outside of the vessel.

Other features which are considered as characteristic for the invention are set forth in the appended claims.

Although the invention is illustrated and described herein as embodied in a device for introducing a power-transmitting machine element into a vessel, it is nevertheless not intended to be limited to the details shown, since various modifications and structural changes may be made therein without departing from the spirit of the invention and within the scope and range of equivalents of the claims.

Figure 2:
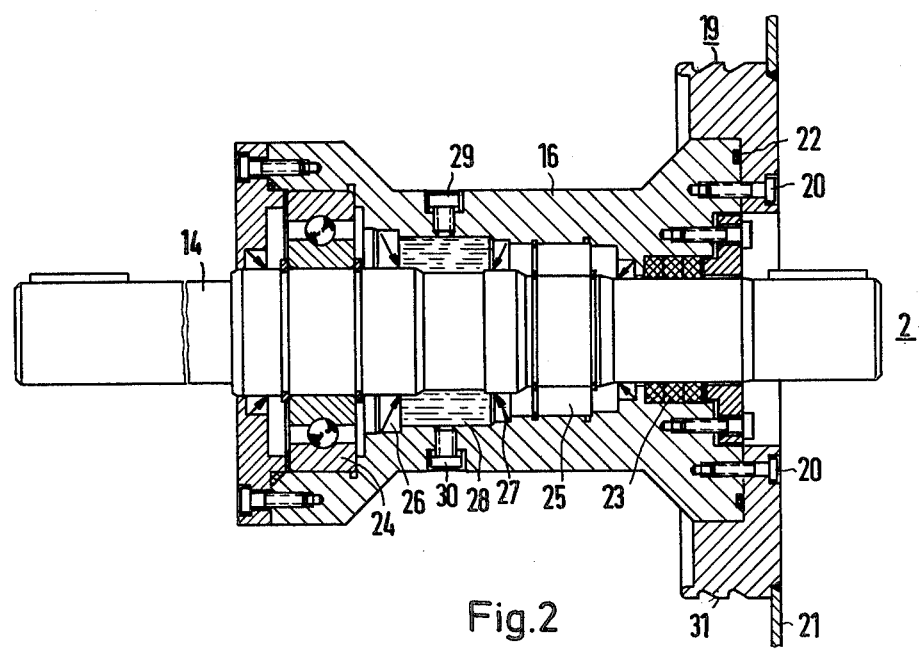

The construction and method of operation of the invention, however, together with additional objects and advantages thereof will be best understood from the following description of specific embodiments when read in connection with the accompanying drawings, in which:

FIG. 1 is a side elevational view of the device for introducing a power-transmitting machine element into a vessel containing an aggressive atmosphere, in accordance with the invention, shown with a glove box; and FIG. 2 is a fragmentary enlarged sectional view of FIG. 1 rotated through 180° and showing a sealed bearing for introducing a drive shaft into a glove box.

Referring now to the drawing and first, particularly, to FIG. 1 thereof, there is shown a glove box mounted on supports 1 and made up of three vessels 2, 3 and 4, disposed one on top of the other. These vessels 2, 3 and 4 are formed with openings 5, to the defining margin or rim of which respective non-illustrated gloves are fastened that, on the one hand, close off the interior of the vessels 2 to 4 tightly against the outside and, on the other hand, permit handling in the interior of the vessels 2 to 4. Another opening 6 serves as a lock for sleucing equipment parts in and out. An electric motor 9 mounted underneath the vessel 1 next to the supports 1 drives V-belt pulleys 11 and 12 by means of a V-belt 10, thereby in turn driving two mixers 7 and 8 located, for example, in the vessels 3 and 2. The V-belt pulleys 11 and 12 are respectively connected to shafts 13 and 14. The shaft 14 is supported in a bearing 15 and in a sealing bearing 16. Inside the glove box, the shaft 14 ends at one side of a coupling 17, the other side of which is connected to the mixer 7 by means of knuckle or universal joints 18. The shaft 13 is also introduced in a similar manner into the interior of the vessel 2.

As is illustrated in detail in FIG. 2, the sealing bearing 16 is bolted to a flange 19 by means of screws 20. The flange 19 is welded into the wall 21 of the vessel 2. The screws 20 are disposed so that they can be loosened only from the interior of the vessel 2. A ring or annular seal 22 seals the sealed bearing 16 against the flange 19. Stuffing-box packing 23, ball bearings 24 and 25 and sliding-ring seals 26 and 27 provide the sealing and actual mounting of the shaft 14. A space 28 between the sliding-ring seals 26 and 27 is accessible by means of a filling screw 29 and a draining screw 30 and is filled with a sealing or packing liquid e.g. hydraulic oil.

Providing this space 28, filled with a sealing liquid, is especially advantageous if poisonous or radiating dust-like or pulverulent substances are present in the interior of the vessel 2. Dust that might penetrate through the seals is then retained in the sealing liquid, ensuring thereby that even the finest dust cannot penetrate to the outside.

The flange 19, at the outer periphery thereof, outside the vessel 2, is formed with a bead-like projection 31 which advantageously, has the same diameter as corresponding projections at the openings 5, to which the non-illustrated rubber gloves are fastened. It is thereby possible, in the event of the occurrence of a defect in the sealed bearing 16, to initially loosen all of the parts located outside the vessel from the sealed bearing 16 (for example, the bearing 15 and the V-belt pulley 12). Then, a non-illustrated rubber covering can be placed over the bead-like projection 31 at the flange 19 so as to enclose the sealed bearing 16 and the shaft 14 completely therein. Thereafter, without allowing a gas-permeable connection between the interior of the vessel 2 and the outer surroundings to be formed, the sealed bearing 16 can be disassembled or disconnected from the flange 19 by loosening the screws 20, and a non-illustrated covering can be screwed to the flange 19 from the inside. After the flange 19 is covered from the inside of the vessel 2, the sealed bearing 16 together with the covering enclosing it can be removed from the outside.

There are claimed:
1. Device for introducing a power-transmitting machine element into a vessel containing an aggressive atmosphere and having a wall formed with openings, to the defining margin of which gloves are, respectively, secured, comprising: a flange set into the wall, a sealing bearing for a force-transmitting machine element mounted on said flange at the outside of the vessel, and threaded fastening means accessible from the interior of the vessel for threadedly fastening the machine element to said flange, said flange having an outer peripheral surface formed with a bead-like projection at the outside of the vessel to which a covering is securable.

2. Device according to claim 1 including means for releasably connecting a drive mechanism for the machine element to the sealing bearing and the machine element, at the outside of the vessel.

* * * * *